US010949845B2

(12) United States Patent
Goldenberg et al.

(10) Patent No.: US 10,949,845 B2
(45) Date of Patent: Mar. 16, 2021

(54) SYSTEMS AND METHODS FOR EXPEDITED PROCESSING OF AUTHENTICATED COMPUTER MESSAGES

(71) Applicant: MasterCard International Incorporated, Purchase, NY (US)

(72) Inventors: Peter Goldenberg, Sunny Isles Beach, FL (US); Johan Gerber, Wildwood, MO (US); Richard Smith, Rayleigh (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 732 days.

(21) Appl. No.: 15/349,540

(22) Filed: Nov. 11, 2016

(65) Prior Publication Data

US 2018/0137504 A1 May 17, 2018

(51) Int. Cl.

*G06Q 20/40* (2012.01)
*G06Q 20/08* (2012.01)
*G06Q 20/38* (2012.01)

(52) U.S. Cl.

CPC .......... *G06Q 20/40* (2013.01); *G06Q 20/085* (2013.01); *G06Q 20/0855* (2013.01); *G06Q 20/382* (2013.01); *G06Q 20/405* (2013.01); *G06Q 20/4016* (2013.01)

(58) Field of Classification Search

CPC .... G06Q 20/40; G06Q 20/4016; G06Q 20/10; G06Q 20/102; G06Q 20/04

See application file for complete search history.

(56) References Cited

U.S. PATENT DOCUMENTS

| | | | |
|---|---|---|---|
| 6,658,393 | B1 | 12/2003 | Basch et al. |
| 8,126,791 | B2 | 2/2012 | Chisholm |
| 8,474,018 | B2 | 6/2013 | Mardikar et al. |
| 2004/0236696 | A1 | 11/2004 | Aoki et al. |
| 2009/0292568 | A1 | 11/2009 | Khosravani et al. |
| 2010/0010930 | A1 | 1/2010 | Allen et al. |

(Continued)

OTHER PUBLICATIONS

Wikipedia, https://en.wikipedia.org/wiki/ISO_8583.*

(Continued)

*Primary Examiner* — Hao Fu
(74) *Attorney, Agent, or Firm* — Armstrong Teasdale LLP

(57) ABSTRACT

A transaction message processing server is configured to receive an authorization request message from a sender computing device, the authorization request message associated with a transaction. The server is also configured to detect a decision data element in an authentication outcome data field of the authorization request message, and interpret the decision data element as an indicator that the transaction is highly authenticated. The server is further configured to retrieve a reason code that identifies the transaction as a highly authenticated transaction, and embed the reason code into the authorization request message to form an enhanced authorization request message. The server is still further configured to transmit the enhanced authorization request message including the reason code to an issuer computing device, wherein the enhanced authorization request message is configured to enable the issuer computing device to bypass at least one issuer authentication process.

20 Claims, 7 Drawing Sheets

(56) References Cited

U.S. PATENT DOCUMENTS

2010/0274720 A1 10/2010 Carlson et al.
2011/0191200 A1 8/2011 Bayer et al.
2012/0197802 A1 8/2012 Smith et al.
2012/0259784 A1 10/2012 Carlson et al.
2012/0310831 A1 12/2012 Harris et al.
2013/0283356 A1 10/2013 Mardikar et al.
2015/0012430 A1 1/2015 Chisholm et al.
2015/0227936 A1 8/2015 Bruesewitz et al.
2015/0356562 A1* 12/2015 Siddens ............ G06Q 20/4016 705/44
2016/0078443 A1 3/2016 Tomasofsky et al.
2016/0098710 A1* 4/2016 Suen .................... G06Q 20/382 705/44
2016/0260100 A1* 9/2016 Wiesman ........... G06Q 20/4016
2016/0321669 A1 11/2016 Beck et al.
2017/0109752 A1* 4/2017 Hubbard ............ G06Q 20/4014
2017/0344729 A1* 11/2017 Kohli .................... G06F 21/105

OTHER PUBLICATIONS

PCT International Search Report and Written Opinion, Application No. PCT/US2017/055710, dated Nov. 22, 2017, 13 pps.
Search Report and Written Opinion, Singapore Application No. 11201903956P, dated Jun. 19, 2020, 7 pps.

* cited by examiner

SYSTEMS AND METHODS FOR EXPEDITED PROCESSING OF AUTHENTICATED COMPUTER MESSAGES

BACKGROUND

This disclosure relates to computer message processing, and, more particularly, to expedited processing of authenticated computer messages.

At least some known credit/debit card purchases involve the exchange of a number of payment card network messages between merchant, acquirer, and issuer members of a multi-party interchange model. Such messages may include authorizations, advices, reversals, account status inquiry presentments, purchase returns and chargebacks. The credit or debit card payment transaction messages may include several transaction attributes, such as, but, not limited to, primary account number (either real or virtual), transaction amount, merchant identifier, acquirer identifier (the combination of which with above uniquely identifies a merchant), transaction date-time, and address verification.

In order to detect and prevent fraudulent transactions, one or more parties to the transaction perform one or more fraud "scoring" or authentication processes. However, at least some parties may have limited access to certain information when performing their own fraud scoring processes, which can lead to inconsistent and/or incompatible outcomes (e.g., one party with more information may approve a transaction while another party with less information may decline the transaction). At least some known systems have attempted to overcome these issues by making more information associated with a transaction available to more parties across the transaction processing system.

BRIEF DESCRIPTION OF THE DISCLOSURE

In one aspect, a transaction message processing server including a processor in communication with a memory is provided. The processor is programmed to receive an authorization request message from a sender computing device, the authorization request message associated with a transaction. The processor is also programmed to detect a decision data element in an authentication outcome data field of the authorization request message, and interpret the decision data element as an indicator that the transaction is a highly authenticated transaction. The processor is also programmed to retrieve from the memory a reason code that identifies the transaction as a highly authenticated transaction as determined by a merchant involved in the transaction, and embed the reason code into the authorization request message to form an enhanced authorization request message. The processor is still further programmed to transmit the enhanced authorization request message including the reason code to an issuer computing device, wherein the enhanced authorization request message is configured to enable the issuer computing device to bypass at least one issuer authentication process.

In another aspect, a merchant computing device including a processor in communication with a memory is provided. The processor is programmed to gather metadata associated with a browsing session initiated by a consumer, and evaluate the gathered metadata to determine an authentication level of a transaction initiated by the consumer during the browsing session. The processor is also programmed to generate an authorization request message associated with the transaction when the authentication level includes highly authenticated. The processor is further programmed to embed a decision data element within an authorization outcome data field of the authorization request message, the decision data element indicating that the transaction is a highly authenticated transaction, and transmit the authorization request message including the decision data element to a transaction message processing server.

In yet another aspect, a method of expedited processing of authenticated computer messages is provided. The method is implemented using a transaction message processing server including a processor in communication with a memory. The method includes receiving an authorization request message from a sender computing device, the authorization request message associated with a transaction. The method also includes detecting a decision data element in an authentication outcome data field of the authorization request message, and interpreting the decision data element as an indicator that the transaction is a highly authenticated transaction. The method further includes retrieving from the memory a reason code that identifies the transaction as a highly authenticated transaction as determined by a merchant involved in the transaction, and embedding the reason code into the authorization request message to form an enhanced authorization request message. The method still further includes transmitting the enhanced authorization request message including the reason code to an issuer computing device, wherein the enhanced authorization request message is configured to enable the issuer computing device to bypass at least one issuer authentication process.

BRIEF DESCRIPTION OF THE DRAWINGS

FIG. 1 is a block diagram of a transaction processing system in accordance with one embodiment of the present disclosure.

FIG. 2 illustrates an example configuration of a client computing device used in the transaction processing system shown in FIG. 1.

FIG. 3 illustrates an example configuration of a server system used in the transaction processing system shown in FIG. 1.

FIG. 4 illustrates an authorization data flow between various components of the transaction processing system shown in FIG. 1.

FIG. 5 illustrates an authorization data flow for a highly authenticated transaction using the transaction processing system shown in FIG. 1.

FIG. 6 is a flowchart of one method for expedited processing of authenticated computer messages.

FIG. 7 is a flowchart of another method for expedited processing of authenticated computer messages.

Figure 1:
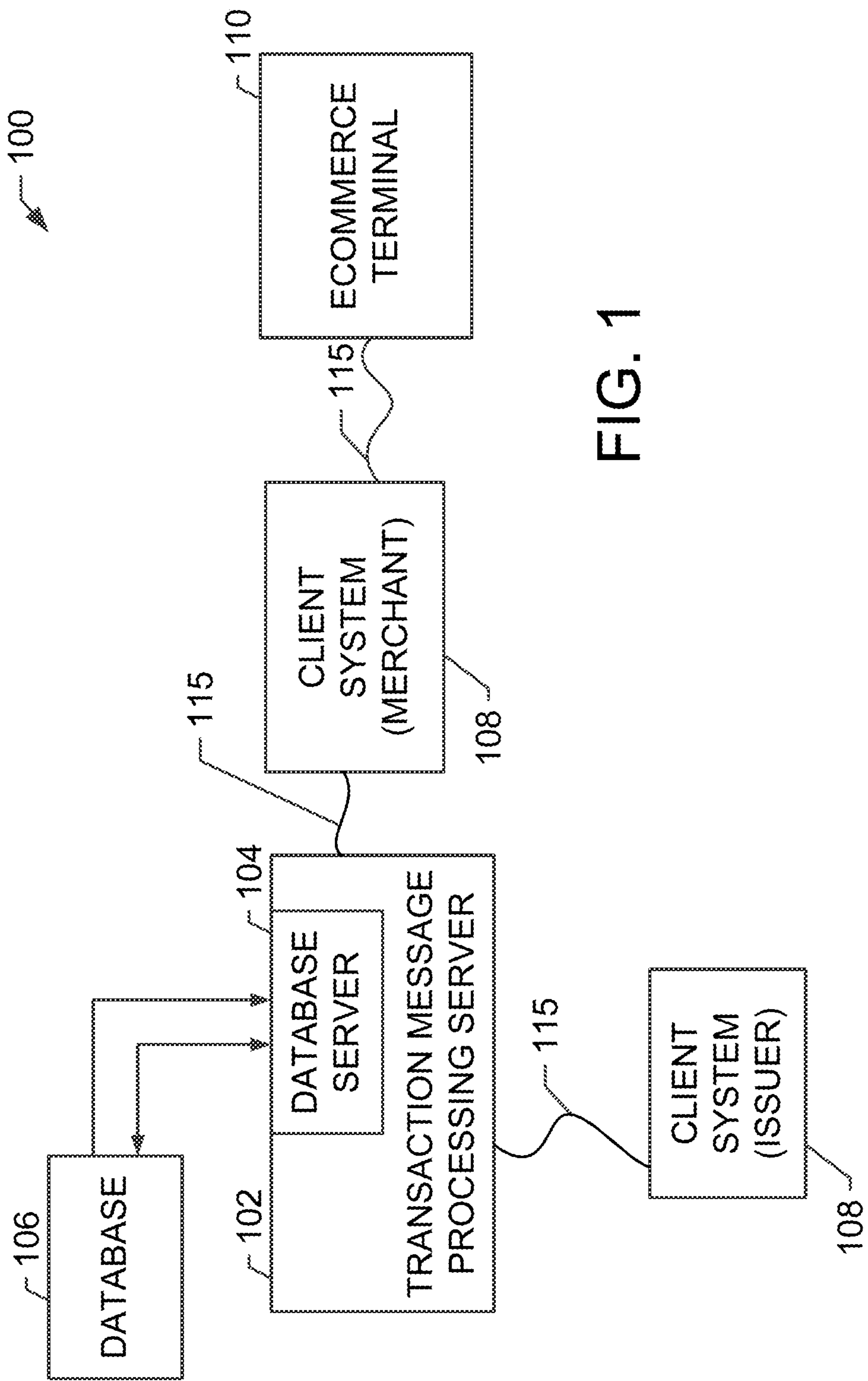
FIGS. 1-7 show example embodiments of the methods and systems described herein.

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

Embodiments of the disclosure describe expedited message processing systems and methods that use a sender's (i.e., merchant's) authentication outcomes that represent the sender's perception of the authentication level of a transaction with a consumer. A defined data field, for example, an "authentication outcome" data field, of an authorization request message enables the sender to embed a specific decision data element, indicating an outcome of the sender's internal risk-based decisioning or authentication process, into an authorization request message. The decision data element located in the authentication outcome data field serves as a flag within the authorization request message. The flag is detected by a transaction message processing server and indicates to the transaction message processing server that this transaction is a low-risk or highly authenticated transaction and, therefore, is a candidate for expedited processing, or consolidated risk-based decisioning. The transaction message processing server embeds a reason code into the authorization request message to form an "enhanced authorization request message," wherein the reason code communicates to the issuer that the sender has performed their own internal authentication or risk-based decisioning and have categorized this transaction as highly authenticated or low risk. The issuer processes the enhanced authorization request message including the embedded reason code and, in the example embodiment, bypasses or forgoes their own authentication process and authorizes or approves the transaction to proceed, improving the efficiency of the transaction processing system, improving transaction processing speeds, and reducing transaction latency for highly authenticated transactions.

During a transaction that occurs at an "ecommerce terminal," or an ecommerce transaction with an online merchant (e.g., at a user computing device such as a smartphone or personal computer), a merchant authentication process (e.g., fraud scoring or risk-based decisioning) takes place before or concurrent with the authorization. At some point before the consumer presses a "buy" button (or otherwise initiates the ecommerce transaction), or when the consumer presses the "buy" button, even before an authorization request is submitted for process, the merchant is attempting to authenticate the consumer and/or the transaction. The merchant attempts to determine if the consumer is a trusted entity or not (i.e., whether the consumer is an actual cardholder of a payment device used to initiate the transaction). For example, the merchant may employ cookies or other background-level metadata-gathering devices to gather metadata associated with the ecommerce transaction, such as a device identifier of the user computing device being used to access the online merchant, consumer behavior, a geolocation and/or IP address of the user computing device, any login information provided, a navigation pattern, and/or any other metadata. The merchant then feeds this gathered metadata into its own authentication algorithms or risk-based decisioning processes to determine an authentication level of the ecommerce transaction.

These "merchant-side" authentication processes are typically conducted without the underlying authentication process being apparent to the consumer. For example, a consumer accesses an associated online banking site from home, which is the usual place from which the consumer accesses the online banking site, and the site responds as usual. However, at a different time, the consumer accesses the associated online banking site from work, which is not the usual place from which the consumer accesses the online banking site. In this case, the online banking site may respond differently because the consumer has attempted to access the online banking site from a different (unrecognized) computing device. The online banking site, based on an unrecognized device ID, may determine that this browsing session is an untrusted browsing session and accordingly may generate an authentication challenge to be issued to the consumer. The authentication challenge may prompt the consumer to answer one or more security questions or input a PIN. Upon receiving correct responses to the authentication challenge, the online banking site may reduce the level of determined risk for the browsing session, having determined that the consumer is the actual cardholder and not an impostor attempting to make a fraudulent transaction. This process is sometimes referred to as "risk-based authentication."

In accordance with embodiments of the present disclosure, the merchant conducts its own internal authentication processes to determine a level of authentication (or a level of risk) of an online transaction based on metadata gathered during a browsing session. The merchant then transmits an authorization request message that includes one or more data elements indicating the merchant's determined level of authentication of the transaction. More specifically, for a transaction that the merchant has determined to be "highly authenticated" or "low risk" based on its own internal authentication processes (a "highly authenticated transaction"), the merchant embeds a decision data element into a specific data field (e.g., an authentication outcome data field) of the authorization request message. The decision data element in the specific authentication outcome data field functions as a "flag." The flag is detected by a transaction message processing server and indicates to the transaction message processing server that this transaction is a highly authenticated transaction and a candidate for expedited processing. As used herein, expedited processing, also referred to as consolidated risk-based decisioning, refers to the bypassing of one or more subsequent issuer authentication processes, reducing transaction latency and bandwidth and improving transaction speeds. For transactions that the merchant has determined to be "moderately authenticated" or "medium risk", the merchant may embed an alternative decision data element that indicates a moderately authenticated transaction and/or may not embed any additional data elements in the authentication outcome field, such that the transaction proceeds according to a typical authorization and authentication process. For transactions that the merchant has determined to be "unauthenticated" or "high risk," the merchant may embed an alternative decision data element in the authentication outcome field, in an alternative data field, and/or may append or append another "unauthenticated" flag that indicates an unauthenticated transaction, such that an authentication challenge will be issued and/or an alternative payment method will be requested. In other words, according to the present disclosure, the outcome of the merchant's own authentication processes drives subsequent authorization and/or authentication processing of the transaction.

The methods and systems described herein may be implemented using computer programming or engineering techniques including computer software, firmware, hardware, or any combination or subset therefor. At least one of the technical problems addressed by this system includes: (i) time-consuming, redundant, and/or unnecessary issuer authentication of transactions authenticated by a merchant, often with less data and at times resulting in needless declines; (ii) increased latency and processing time wasted in running these issuer authentication processes; and/or (iii) inability of merchants to assure other parties to a transaction of the outcome of their own authentication processes.

The technical effect of the systems and methods described herein is achieved by performing at least one of the following steps: (a) receiving an authorization request message from a sender computing device, the authorization request message associated with a transaction; (b) detecting a decision data element in an authentication outcome data field of the authorization request message; (c) interpreting the decision data element as an indicator that the transaction is a highly authenticated transaction; (d) retrieving from the memory a reason code that identifies the transaction as a highly authenticated transaction as determined by a merchant involved in the transaction; (e) embed the reason code into the authorization request message to form an enhanced authorization request message; (f) transmitting the enhanced authorization request message including the reason code to an issuer computing device, wherein the enhanced authorization request message is configured to enable the issuer computing device to bypass at least one issuer authentication process; (g) gathering metadata associated with a browsing session initiated by a consumer; (h) evaluating the gathered metadata to determine an authentication level of a transaction initiated by the consumer during the browsing session; (i) when the authentication level includes highly authenticated, generating an authorization request message associated with the transaction; (j) embedding a decision data element within an authorization outcome data field of the authorization request message, the decision data element indicating that the transaction is a highly authenticated transaction; and/or (k) transmitting the authorization request message including the decision data element to a transaction message processing server.

The resulting technical effect achieved by the systems and methods described herein is at least one of: (i) augmenting network messages to enable merchants to embed assurance/risk levels for transmission to and interpretation by other parties to a transaction; (ii) reduced processing time and reduced network latency by eliminating one or more authentication processes from low-risk transaction authorization streams; and/or (iii) reduced needless issuer declines.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a simplified block diagram of an example transaction processing system 100 including a plurality of computer devices for expedited processing of authenticated computer messages. In the example embodiment, the plurality of computer devices includes, for example, a transaction message processing server 102, client systems 108 (e.g., a merchant client system and an issuer client system), and an ecommerce terminal 110.

More specifically, in the example embodiment, client systems 108 are communicatively coupled to transaction message processing server 102. In one embodiment, client systems 108 are computers including a web browser, such that transaction message processing server 102 is accessible to client systems 108 using the Internet. Client systems 108 are interconnected to the Internet through many interfaces including a network 115, such as a local area network (LAN) or a wide area network (WAN), dial-in-connections, cable modems, and special high-speed Integrated Services Digital Network (ISDN) lines. Client systems 108 could be any device capable of interconnecting to the Internet including a web-based phone ("smartphone"), PDA, personal (laptop or desktop) computer, wearable computing device (e.g., "smart glasses" or a "smart watch"), or other web-based connectable equipment.

A database server 104 is connected to a database 106, which contains information on a variety of matters, as described below in greater detail. In one embodiment, centralized database 106 is stored on transaction message processing server 102 and can be accessed by potential users at one of client systems 108 by logging onto transaction message processing server 102 through one of client systems 108. In an alternative embodiment, database 106 is stored remotely from transaction message processing server 102 and may be non-centralized.

Database 106 may include a single database having separated sections or partitions or may include multiple databases, each being separate from each other. Database 106 may store transaction data generated as part of sales activities conducted over the processing network including data relating to merchants, account holders or customers, issuers, acquirers, purchases made.

In a typical transaction processing system, a financial institution called the "issuer" issues a transaction card, such as a credit card, to a consumer or cardholder, who uses the transaction card to tender payment for a purchase from a merchant. To accept payment with the transaction card, the merchant must normally establish an account with a financial institution that is part of the financial payment system. This financial institution is usually called the "merchant bank," the "acquiring bank," or the "acquirer." When the cardholder tenders payment for a purchase with a transaction card, the merchant requests authorization from a merchant bank for the amount of the purchase, for example, by receiving account information associated with the cardholder and communicating the account information to the merchant bank. Using a payment processor, the merchant will communicate with the issuer bank to determine whether the cardholder's account is in good standing and whether the purchase is covered by the cardholder's available credit line. Based on these determinations, the request for authorization will be declined or accepted. If a request for authorization is accepted, the available credit line of the cardholder's account is decreased. If the cardholder uses a debit card, the available funds in the cardholder's account will be decreased. The payment processor may store the transaction card information, such as a type of merchant, amount of purchase, date of purchase, in database 106.

After a purchase has been made, a clearing process occurs to transfer additional transaction data related to the purchase among the parties to the transaction. More specifically, during and/or after the clearing process, additional data, such as a time of purchase, a merchant name, a type of merchant, purchase information, account-holder account information, a type of transaction, savings information, information regarding the purchased item and/or service, and/or other suitable information, is associated with a transaction and transmitted between parties to the transaction as transaction data. The payment processor may store the transaction data in database 106. As described herein, transaction data includes such elements as a transaction amount; a merchant identifier; an account identifier (associating the transaction with the cardholder); a time and date stamp; and a location identifier, which may identify where the transaction was initiated, a location of the cardholder at the time the transaction was initiated, and/or the location of the merchant (e.g., a merchant computing device such as a point-of-sale device). In some embodiments, transaction data may be stored in database 106 in an aggregated and/or anonymized format, such that no personally identifiable information is stored therein.

Database 106 may also store account data including at least one of a cardholder name, a cardholder address, a primary account number (PAN) associated with the cardholder name, other account identifier(s), and/or device identifier(s) of user computing devices used by the cardholder. Database 106 may also store merchant data including a merchant identifier that identifies each merchant registered to use the network, and instructions for settling transactions including merchant bank account information. Database 106 may also store purchase data associated with items being purchased by a cardholder from a merchant, and authorization request data. Database 106 may store picture files associated with the item or service for sale by the merchant user, name, price, description, shipping and delivery information, instructions for facilitating the transaction, and other information to facilitate processing according to the method described in the present disclosure.

In the example embodiment, one of client systems 108 may be associated with a merchant and/or an acquirer bank (i.e., a "sender") while another one of client systems 108 may be associated with an issuer bank. Ecommerce terminal 110 may be associated with a merchant client system 108 or may be a computer system and/or mobile system used by a cardholder making an on-line purchase or payment. Moreover, ecommerce terminal 110 may be any point-of-sale device capable of enabling any kind of transaction, not merely an ecommerce transaction. Ecommerce terminal 110 may therefore include a smartphone, point of sale device (e.g., card reader), personal computing device, and/or any other transaction-enabling device. Transaction message processing server 102 may be a payment processor. In the example embodiment, transaction message processing server 102 is associated with a financial transaction processing network (i.e., transaction processing network 100), and may be referred to as an interchange computer system. Transaction message processing server 102 may be used for processing transaction data. In the example embodiment, the transaction data is transmitted in an ISO® 8583 compliant data message. As used herein, "ISO®" refers to a series of standards approved by the International Organization for Standardization. (ISO is a registered trademark of the International Organization for Standardization of Geneva, Switzerland.) ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations or data fields for storing Private Data Elements. In some embodiments, the communication between client systems 108 and transaction message processing server 102 (e.g., communication of data messages such as authorization request and response messages over communications network 115) conforms to the ISO® 8583 international standards.

In addition, client systems 108 may include a computer system associated with at least one of an online bank, a bill payment outsourcer, an acquirer bank, an acquirer processor, an issuer bank associated with a transaction card, an issuer processor, a remote payment processing system, a biller, a payment platform, and/or a transaction platform. Accordingly, each party involved in processing transaction data are associated with a computer system shown in system 100 such that the parties can communicate with one another as described herein.

Figure 2:
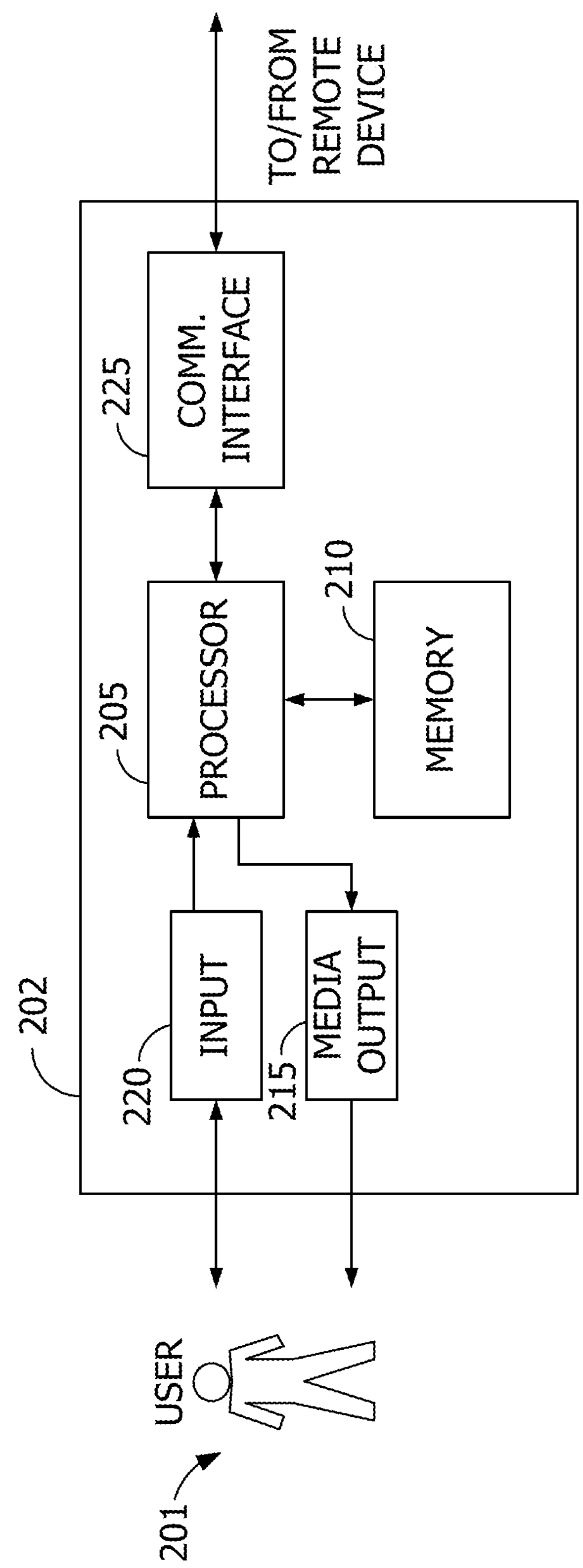

FIG. 2 illustrates an example configuration of a client computing device 202. Client computing device 202 may include, but is not limited to, client systems 108 and/or ecommerce terminal 110 shown in FIG. 1. Client computing device 202 includes a processor 205 for executing instructions. In some embodiments, executable instructions are stored in a memory area 210. Processor 205 may include one or more processing units (e.g., in a multi-core configuration) . Memory area 210 is any device allowing information such as executable instructions and/or other data to be stored and retrieved. Memory area 210 may include one or more computer-readable media.

Client computing device 202 also includes at least one media output component 215 for presenting information to a user 201. Media output component 215 is any component capable of conveying information to user 201. In some embodiments, media output component 215 includes an output adapter such as a video adapter and/or an audio adapter. An output adapter is operatively coupled to processor 205 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 202 includes an input device 220 for receiving input from user 201. Input device 220 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 215 and input device 220.

Client computing device 202 may also include a communication interface 225, which is communicatively coupleable to a remote device such as a transaction message processing server 102 (shown in FIG. 1) or a web server operated by a merchant. Communication interface 212 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer-readable instructions for providing a user interface to user 201 via media output component 215 and, optionally, receiving and processing input from input device 220. A user interface may include, among other possibilities, a web browser and client application. Web browsers enable users 201 to display and interact with media and other information typically embedded on a web page or a website from a web server associated with a merchant. A client application allows users 201 to interact with a server application associated with, for example, an online merchant.

Figure 3:
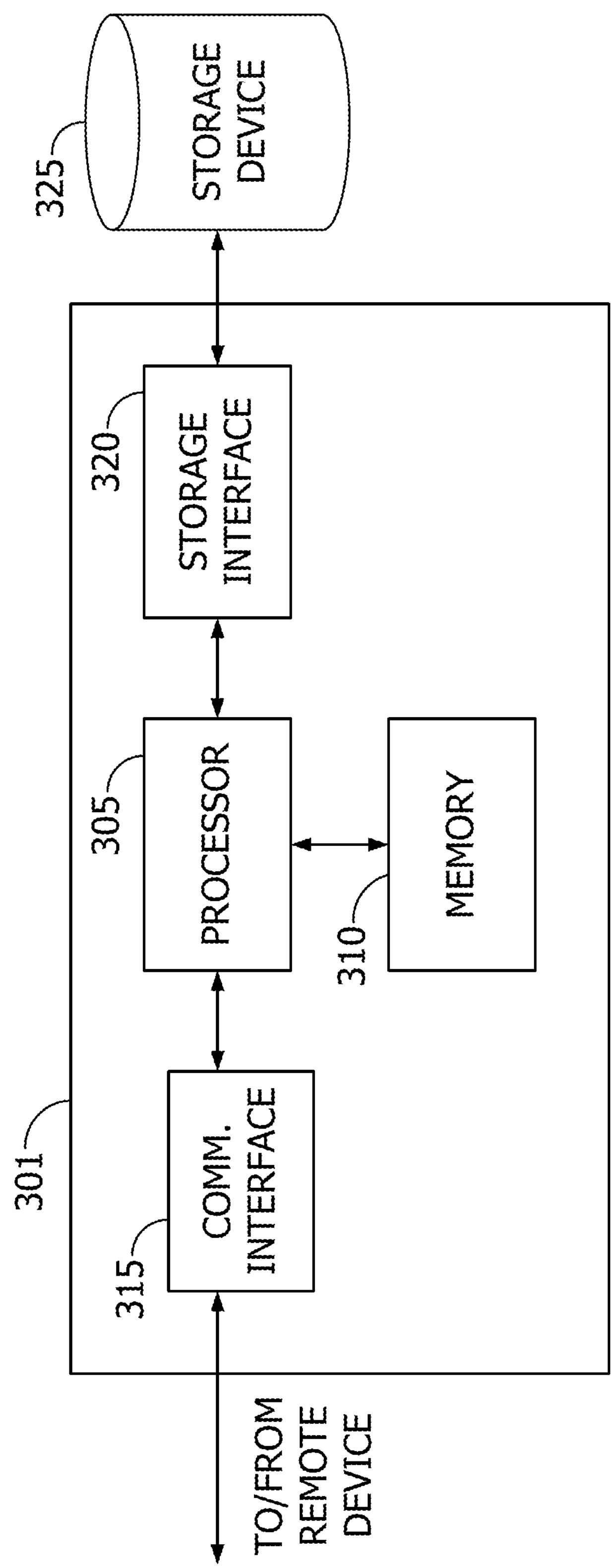

FIG. 3 illustrates an example configuration of a server computing device 301. Server computing device 301 may include, but is not limited to, transaction message processing server 102, database server 104, and/or client systems 108 (all shown in FIG. 1). Server computing device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computing device 3012 is capable of communicating with a remote device such as client computing device 202 or another server computing device 301. For example, communication interface 315 may receive requests from client systems 108 via the Internet, as illustrated in FIG. 1.

Processor 305 may also be operatively coupled to a storage device 325. Storage device 325 is any computer-operated hardware suitable for storing and/or retrieving data. In some embodiments, storage device 325 is integrated in server computing device 301. For example, server computing device 301 may include one or more hard disk drives as storage device 325. In other embodiments, storage device 325 is external to server computing device 301 and may be accessed by a plurality of server computing devices 301. For example, storage device 325 may include multiple storage units such as hard disks or solid state disks in a redundant array of inexpensive disks (RAID) configuration. Storage device 325 may include a storage area network (SAN) and/or a network attached storage (NAS) system.

In some embodiments, processor 305 is operatively coupled to storage device 325 via a storage interface 320. Storage interface 320 is any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 325.

Memory areas 310 and 210 (shown in FIG. 2) may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 4:
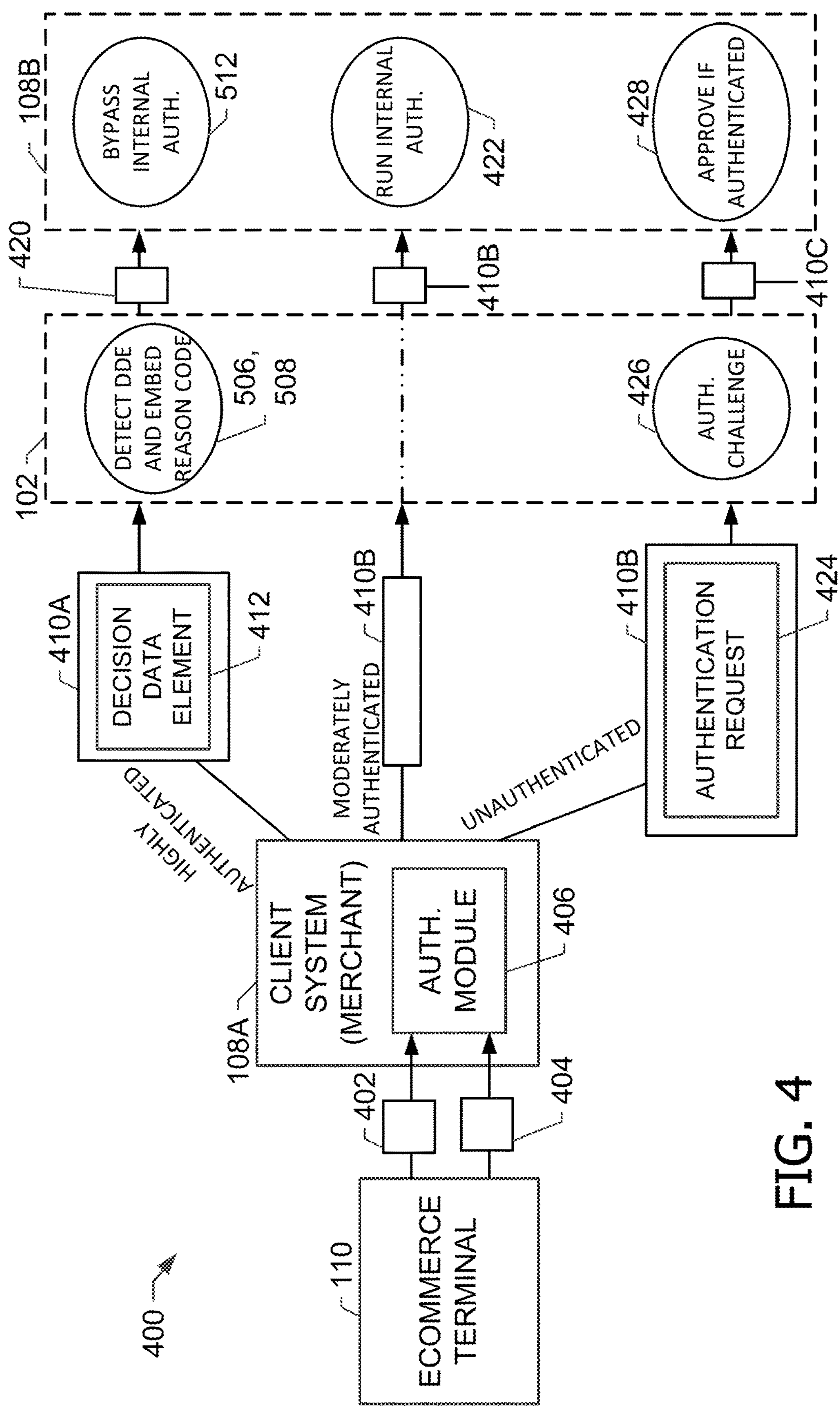
Figure 5:
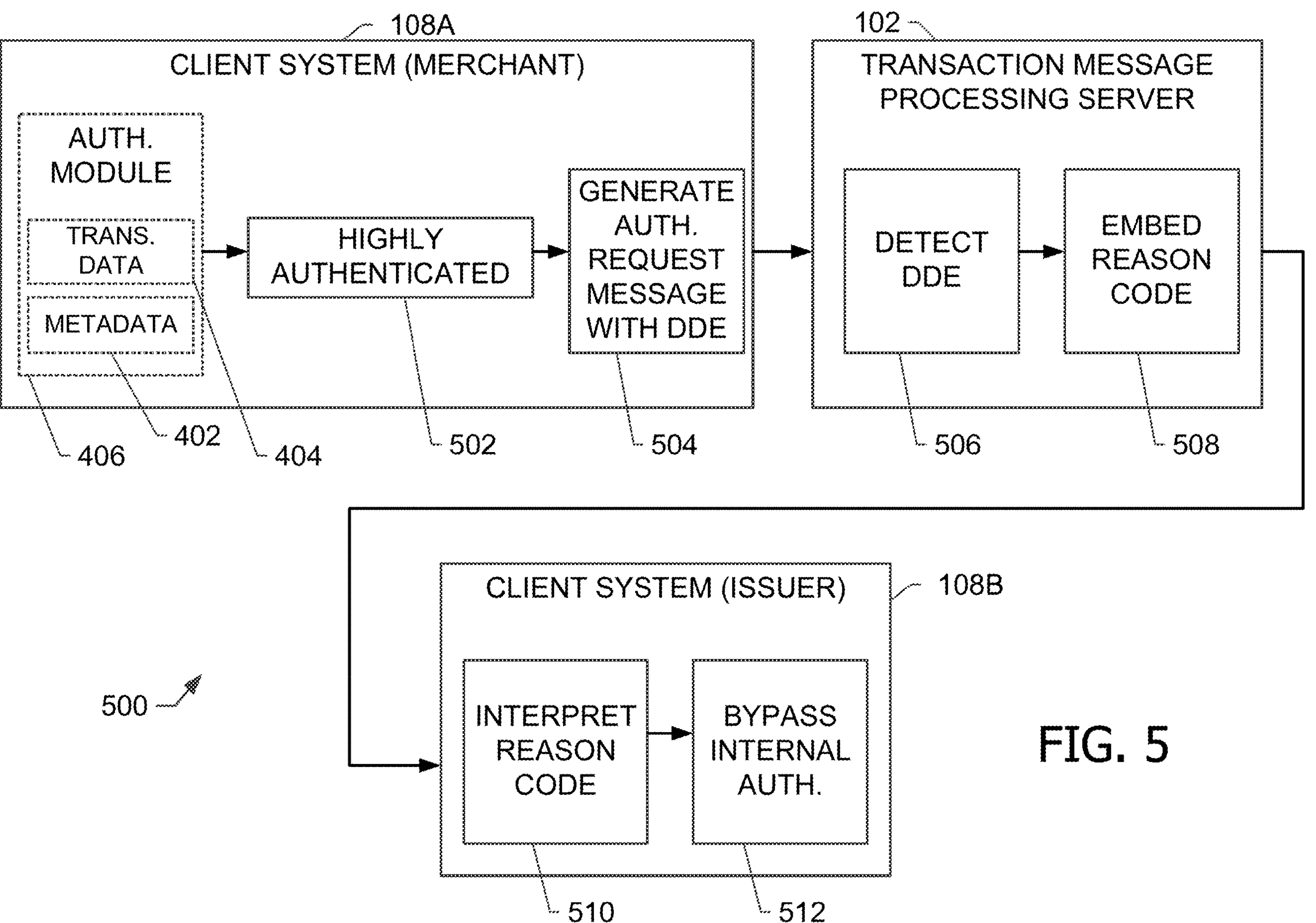

FIG. 4 is an authorization data flow diagram 400 illustrating the flow of data between various components of transaction processing system 100 (shown in FIG. 1). More particularly, data flow diagram 400 illustrates an authentication/authorization data flow for an online transaction (and/or an alternative transaction, including any card present and/or card-not-present transaction) initiated at an ecommerce terminal 110 (also shown in FIG. 1) by a consumer using a payment device (e.g., a payment card, digital wallet, etc.). FIG. 5 is a more detailed authorization data flow diagram 500 illustrating the authentication/authorization data flow for a highly authenticated or low-risk transaction. Further reference is made to both FIGS. 4 and 5. As described herein, ecommerce terminal 110 may include a dedicated point-of-sale terminal for a merchant (e.g., merchant client system 108A) or may include any user computing device capable of accessing the Internet and accessing a website or client application maintained by the merchant (e.g., a smartphone, personal computer, tablet, etc.).

In the illustrated embodiment, the consumer (not shown) has initiated a browsing session at a website or client application associated with an online merchant. During the browsing session, merchant client system 108A is retrieving, accessing, receiving, and/or otherwise gathering browsing session metadata 402 (e.g., using website cookies). As described herein, metadata 402 may include a device identifier of ecommerce terminal 110 being used to access the online merchant, consumer behavior, a geolocation and/or IP address of ecommerce terminal 110, any login information provided (e.g., a username, email address, password, etc., used to login to a user profile associated with the online merchant), a navigation pattern, and/or any other metadata. In the example embodiment, merchant client system 108A presents the consumer with an option to permit or deny such gathering of metadata 402.

After the consumer has selected one or more items (e.g., goods and/or services) they wish to purchase, the consumer initiates the online transaction (e.g., by selecting a "buy"

command). In so doing, the consumer provides transaction-associated data 404 to merchant client system 108A, such as a shipping address, payment device information, item identifier(s), and/or other transaction-associated data 404.

Merchant client system 108A accesses an authentication module 406 to process metadata 402 and transaction-associated data 404, to attempt to determine whether the consumer is an actual cardholder of the payment device used to initiate the transaction. For example, merchant client system 108A may compare metadata 402 and/or transaction-associated data 404 to historical data associated with the consumer (e.g., from past browsing sessions and/or completed transactions). Additionally or alternatively, merchant client system 108A may process metadata 402 and/or transaction-associated data 404 using a plurality of rules (e.g., which countries are high-risk countries, whether a transaction amount of the transaction is within a "normal" range, etc.).

Based on output from authentication module 406, the transaction is identified or indicated to be one of (a) a highly authenticated or low-risk transaction, (b) a moderately authenticated or medium-risk transaction, or (c) an unauthenticated or high-risk transaction. This identification by merchant client system 108A of the authentication and/or risk level of the transaction drives the subsequent authorization (and/or authentication, in the cases of medium- and high-risk transactions) process for the transaction.

For a transaction identified (502) as a highly authenticated transaction, merchant client system 108A generates (504) an authorization request message 410A including a decision data element 412 in an authentication outcome data field. For example, for an ISO 8583 network message 410A, decision data element 412 is a bit with a value of "2" within a DE61s8 data subfield. Merchant client system 108A transmits authorization request message 410A to transaction message processing server 102 (shown in FIG. 1).

Transaction message processing server 102 receives authorization request message 410A and detects (506) decision data element 412 within the authentication outcome data field. Decision data element 412 functions as a "flag" within authorization request message 410A that this particular ecommerce transaction has been determined to be a highly authenticated ecommerce transaction by the merchant (e.g., merchant client system 108A) involved in the ecommerce transaction. Detection of decision data element 412 causes transaction message processing server 102 to embed (508) a specialized reason code into authorization request message 410A to form an enhanced authorization request message 420 that transaction message processing server 102 transmits to an issuer client system 108B. Reason codes are specific codes formatted in a format that is readily interpretable by issuer client system 108B. More particularly, each reason code is programmed or defined with a specific function or definition, and the reason codes with associated functions/definitions are transmitted to issuer client systems 108B. Issuer client systems 108B store the reason codes with associated functions/definitions such that incoming messages including one or more reason codes can be interpreted by issuer client systems 108B during processing of the incoming messages. In the example embodiment, the embedded reason code identifies the transaction as a highly authenticated transaction. Enhanced authorization request message 420 includes decision data element 412 as well as the embedded reason code.

Issuer client system 108B receives enhanced authorization request message 420 and processes enhanced authorization request message 420 as it would process any received authorization request message. However, when issuer client system 108B processes and interprets (510) the embedded reason code, in the example embodiment, issuer client system 108B bypasses (512) at least one internal issuer authentication process and approves the low-risk transaction based upon the merchant's assurance of the risk level of the transaction (as communicated to issuer client system 108B via the embedded reason code). More specifically, the embedded reason code is configured to cause issuer client system 108B to bypass (512, e.g., forego or override) the issuer authentication process, consolidating the transaction process, improving transaction processing speeds, and reducing transaction latency. The embedded reason code communicates to issuer client system 108B a specified level of assurance from the merchant that the transaction has a low risk of being fraudulent.

With continued reference to FIG. 4, when a transaction is determined by the merchant (e.g., merchant client system 108A) to be a "moderately authenticated" or "medium-risk" transaction, the authorization process proceeds as normal. Merchant client system 108A generates and transmits an authorization request message 410B to transaction message processing server 102. In some embodiments, authorization request message 410B includes a blank or empty authentication outcome data field. Alternatively, authorization request message 410B includes an alternative decision data element (not shown) in the authentication outcome data field, the alternative decision data element identifying the transaction as a moderately authenticated or medium-risk transaction. Transaction message processing server 102 receives authorization request message 410B and transmits authorization request message 410B to issuer client system 108B for further processing. Issuer client system 108B receives and process authorization request message 410B and, without assurance from the merchant that the transaction is highly authenticated or low risk, performs (422) one or more additional internal authentication processes. Issuer client system 108B chooses to decline or approve the transaction based upon its own authentication outcomes.

For "unauthenticated" or "high-risk" transactions, merchant client system 108A generates and transmits an authorization request message 410C including a request 424 that further authentication be performed. In some embodiments, request 424 is formatted as a data decision element in the authentication outcome data field. Alternatively, request 424 may be an appended data element or a data element embedded within a different data field in authorization request message 410C. Transaction message processing server 102 receives authorization request message 410C and, based on authentication request 424, issues (426) one or more authentication challenges and/or request an alternative form of payment from the consumer. Transaction message processing server 102 transmits the authorization request message 410C to issuer client system 108B with an indication of the outcome of the authentication challenge(s) issued by transaction message processing server 102. Issuer client system 108B typically only approves (428) the transaction if the authentication by transaction message processing server 102 was successful.

Figure 6:
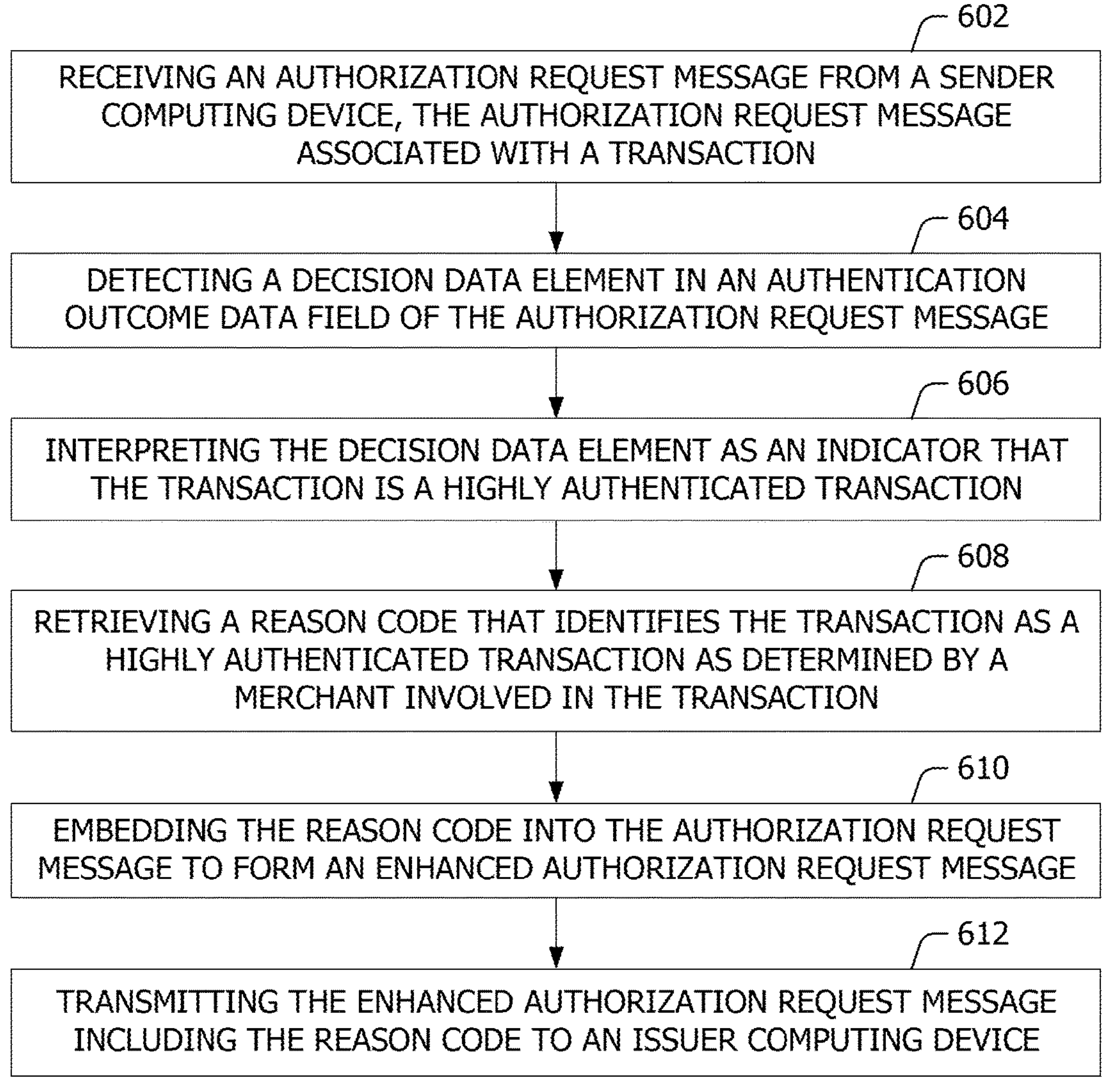

FIG. 6 is a flowchart of one method 600 for expedited processing of authenticated computer messages. Method 600 may be implemented using transaction processing system 100, more specifically, using transaction message processing server 102 (both shown in FIG. 1).

Method 600 includes receiving 602 an authorization request message (e.g., authorization request message 410A) from a sender computing device (e.g., merchant client system 108A and/or an acquirer client system, not shown), the authorization request message associated with a transaction. Method 600 also includes detecting 604 a decision data element (e.g., decision data element 412) in an authentication outcome data field of the authorization request message, and interpreting 606 the decision data element as an indicator that the transaction is a highly authenticated transaction. Method 600 further includes retrieving 608 a reason code (e.g., from a memory, such as database 106) that identifies the transaction as a highly authenticated transaction as determined by a merchant involved in the transaction.

Method 600 also includes embedding 610 the reason code into the authorization request message to form an enhanced authorization request message (e.g., enhanced authorization request message 420), and transmitting 612 the enhanced authorization request message including the reason code to an issuer computing device (e.g., issuer client system 108B). The enhanced authorization request message is configured to enable the issuer computing device to bypass at least one issuer authentication process, to consolidate the risk-based decisioning for the highly authenticated transaction. It should be understood that method 600 may include fewer, additional, and/or alternative steps than those shown in FIG. 6.

Figure 7:
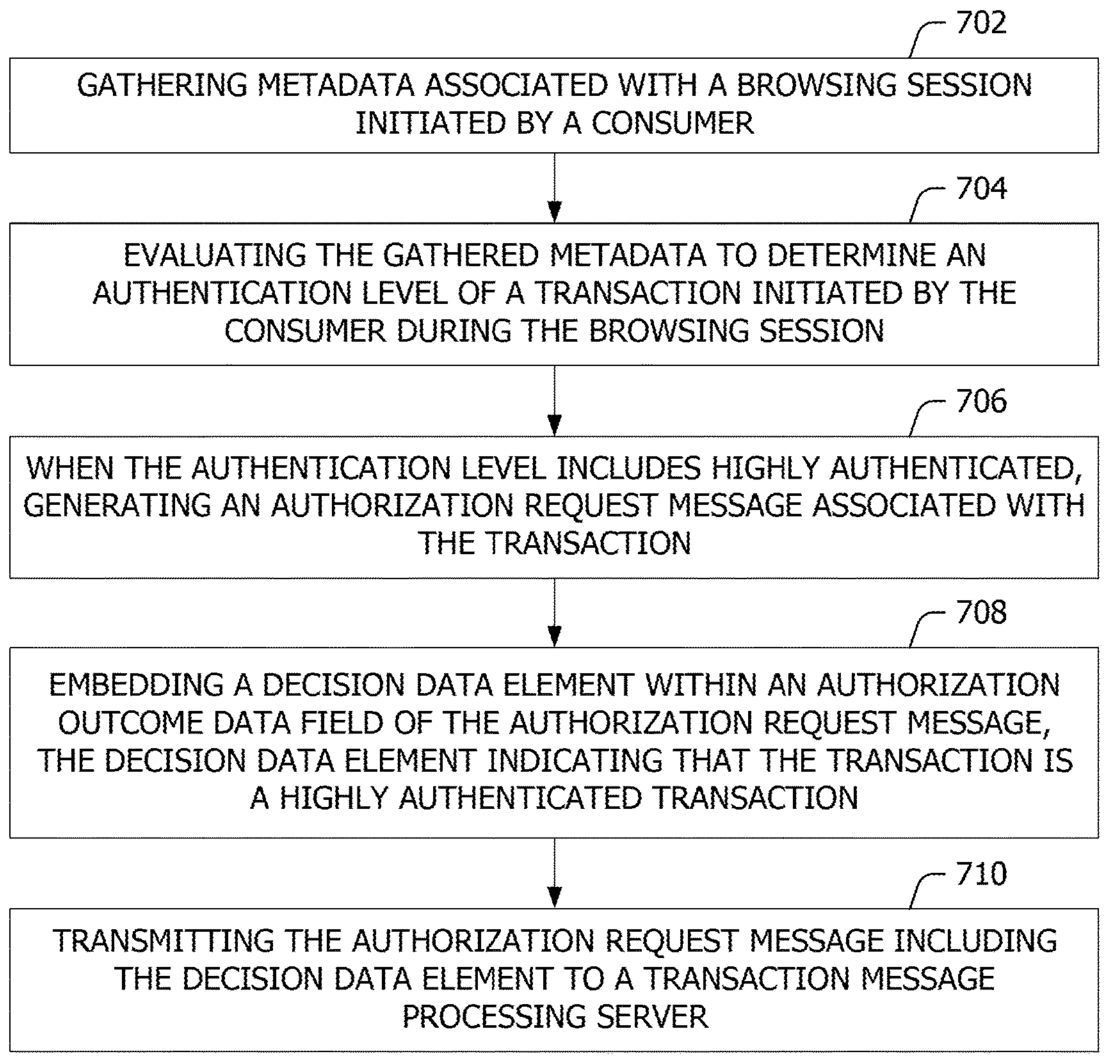

FIG. 7 is a flowchart of another method 700 for expedited processing of authenticated computer messages. Method 700 may be implemented using transaction processing system 100, more specifically, using a merchant client system 108 (both shown in FIG. 1).

Method 700 includes gathering 702 metadata (e.g., metadata 402) associated with a browsing session initiated by a consumer, and evaluating 704 the gathered metadata to determine an authentication level of a transaction initiated by the consumer during the browsing session. In some embodiments, method 700 may further include evaluating transaction-associated data (e.g., transaction-associated data 404) generated when the consumer initiates the transaction.

Method 700 further includes, when the authentication level includes highly authenticated, generating 706 an authorization request message (e.g., authorization request message 410A) associated with the transaction, and embedding 708 a decision data element (e.g., decision data element 412) within an authorization outcome data field of the authorization request message. The decision data element indicates that the transaction is a highly authenticated transaction. Method 700 also includes transmitting 710 the authorization request message including the decision data element to a transaction message processing server (e.g., transaction message processing server 102).

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 204, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A transaction message processing server comprising;

a processor; and a memory in communication with said processor, wherein said processor is programmed to:

associate a first authentication data field with a first location within an ISO8583 network message for receiving a decision data element, wherein the decision data element indicates a level of authentication determined by a merchant for a payment transaction when the payment transaction is initiated by a cardholder for authorization by an issuer, the ISO8583 network message including data representing the payment transaction, wherein the decision data element indicates that the merchant determined that the payment transaction is one of (i) highly authenticated and low risk, (ii) moderately authenticated and moderate risk, and (iii) unauthenticated and high risk;

associate a second authentication data field with a second location within the ISO8583 network message for receiving an authentication reason code, wherein the authentication reason code indicates to the issuer the level of authentication determined by the merchant for the payment transaction, wherein the ISO8583 network message having the first authentication data field and the second authentication data field form an enhanced ISO8583 message;

store, in the memory, (i) the association of the first authentication data field with the first location within the enhanced ISO8583 message for receiving the decision data element; (ii) the association of the second authentication data field with the second location within the enhanced ISO8583 message for receiving an authentication reason code; and (iii) the reason codes each having a definition, determined by the merchant, associated therewith including one of highly authenticated, moderately authenticated, and unauthenticated;

provide the reason codes, the reason code definitions and the second location of the second authentication data field within the enhanced ISO8583 message to an issuer computing device;

receive a first authorization request message from a sender computing device, the first authorization request message associated with a first payment transaction and formatted as an enhanced ISO8583 message transmitted over a transaction processing network;

detect, based on the first location of the first authentication data field, the decision data element embedded in the first authentication data field of the first authorization request message;

interpret the decision data element as an indicator that the transaction is a highly authenticated transaction;

in response to the indicator, retrieve from the memory a first of the reason codes, the first reason code being defined to indicate that the transaction is identified as a highly authenticated transaction as determined by the merchant involved in the transaction and the transaction is eligible for expedited processing;

modify the first authorization request message by embedding the first reason code into the second authentication data field of the first authorization request message; and transmit the modified first authorization request message including the embedded first reason code to the issuer computing device, wherein the embedded first reason code, when processed by the issuer computing device, is configured to cause the issuer computing device to perform the expedited processing by bypassing at least one issuer authentication process to automatically authenticate the first payment transaction, thereby improving transaction processing speeds over the transaction processing server.

2. The transaction message processing server of claim 1, wherein the first authentication data field comprises a DE61s8 data field.

3. The transaction message processing server of claim 2, wherein the decision data element comprises a bit with a value of 2.

4. The transaction message processing server of claim 1, wherein the decision data element is a merchant-embedded data element.

5. The transaction message processing server of claim 1, wherein the first reason code is formatted in a format interpretable by the issuer computing device.

6. The transaction message processing server of claim 1, wherein the issuer computing device is configured to store the plurality of reason code definitions at the issuer computing device, the plurality of reason code definitions enabling the issuer computing device to interpret the first reason code.

7. The transaction message processing server of claim 1, wherein the first authorization request message further includes the decision data element.

8. A merchant computing device comprising:

a processor; and a memory, wherein said processor is programmed to:

receive, from a transaction message processing server, an association of a first authentication data field with a first location within an ISO8583 network message for embedding a decision data element, wherein the decision data element indicates a level of authentication determined by a merchant associated with the merchant computing device for a payment transaction when the payment transaction is initiated by a cardholder for authorization by an issuer, the ISO8583 network message including data representing the payment transaction, wherein the decision data element indicates that the merchant determined that the payment transaction is one of (i) highly authenticated and low risk, (ii) moderately authenticated and moderate risk, and (iii) unauthenticated and high risk, the ISO8583 network message including the decision data element being an enhanced ISO8583 message;

store, in the memory, the received association of the first authentication data field with the first location within the enhanced ISO8583 message for embedding the decision data element;

gather metadata associated with a browsing session initiated by a consumer;

evaluate the gathered metadata through an authentication process of the merchant to determine the authentication level of a first payment transaction initiated by the consumer during the browsing session;

when the authentication level includes highly authenticated, generate an authorization request message associated with the first payment transaction and formatted as an enhanced ISO8583 message transmitted over a transaction processing network;

embed the decision data element into the first authentication data field of the authorization request message, the decision data element indicating that the transaction is a highly authenticated transaction and is eligible for expedited processing; and transmit the authorization request message including the embedded decision data element to the transaction message processing server, wherein the embedded decision data element is configured to be automatically detected and interpreted by the transaction message processing server, based on the embedded decision data element being in the first authentication data field, to cause the transaction message processing server to automatically authenticate the transaction, thereby improving transaction processing speeds over the transaction processing server.

9. The merchant computing device of claim 8, wherein the first authentication data field comprises a DE61s8 data field.

10. The merchant computing device of claim 9, wherein the decision data element comprises a bit with a value of 2.

11. The merchant computing device of claim 8, wherein the gathered metadata comprises at least one of a device identifier of a user computing device at which the browsing session is initiated, consumer behavior during the browsing session, an IP address of the user computing device, a geolocation of the user computing device, and login credentials provided by the consumer during the browsing session.

12. The merchant computing device of claim 8, wherein said processor is further programmed to receive transaction-associated data when the consumer initiates the transaction.

13. The merchant computing device of claim 12, wherein the transaction-associated data includes at least one of a payment device identifier of a payment device used to initiate the transaction, an item identifier of an item purchased in the transaction, a shipping address, and a billing address.

14. The merchant computing device of claim 12, wherein said processor is further programmed to evaluate the metadata and the transaction-associated data to determine the authentication level of the transaction.

15. A method of expedited processing of authenticated computer messages, the method implemented using a transaction message processing server including a processor in communication with a memory, the method comprising:

associating a first authentication data field with a first location within an ISO8583 network message for receiving a decision data element, wherein the decision data element indicates a level of authentication determined by a merchant for a payment transaction when the payment transaction is initiated by a cardholder for authorization by an issuer, the ISO8583 network message including data representing the payment transaction, wherein the decision data element indicates that the merchant determined that the payment transaction is one of (i) highly authenticated and low risk, (ii) moderately authenticated and moderate risk, and (iii) unauthenticated and low risk;

associating a second authentication data field with a second location within the ISO8583 network message for receiving an authentication reason code, wherein the authentication reason code indicates to the issuer the level of authentication determined by the merchant for the payment transaction, wherein the ISO8583 network message having the first authentication data field and the second authentication data field form an enhanced ISO8583 message;

storing, in the memory, (i) the association of the first authentication data field with the first location within the enhanced ISO8583 message for receiving the decision data element; (ii) the association of the second authentication data field with the second location within the enhanced ISO8583 message for receiving an authentication reason code; and (iii) the reason codes each having a definition, determined by the merchant, associated therewith including one of highly authenticated, moderately authenticated, and unauthenticated;

providing the reason codes, the reason code definitions and the second location of the second authentication data field within the enhanced ISO8583 message to an issuer computing device;

receiving a first authorization request message from a sender computing device, the first authorization request message associated with a first payment transaction and formatted as an enhanced ISO8583 message transmitted over a transaction processing network;

detecting, based on the first location of the authentication data field, the decision data element in the first authentication data field of the first authorization request message;

interpreting the decision data element as an indicator that the transaction is a highly authenticated transaction;

in response to the indicator, retrieving from the memory a first of the reason codes, the first reason code being defined to indicate that the transaction is identified as a highly authenticated transaction based on an internal authentication process performed by the merchant involved in the transaction and the transaction is eligible for expedited processing;

modifying the first authorization request message by embedding the first reason code into the second authentication data field of the first authorization request message; and transmitting the modified first authorization request message including the embedded first reason code to the issuer computing device, wherein the embedded first reason code, when processed by the issuer computing device, is configured to cause the issuer computing device to perform the expedited processing by bypassing at least one issuer authentication process to automatically authenticate the first payment transaction, thereby improving transaction processing speeds over the transaction processing server.

16. The method of claim 15, wherein the first authentication data field includes a DE61s8 data field and the decision data element includes a bit with a value of 2.

17. The method of claim 15, further comprising formatting the reason code in a format interpretable by the issuer computing device.

18. The method of claim 15, the issuer computing device is configured to store the plurality of reason code definitions at the issuer computing device, the plurality of reason code definitions enabling the issuer computing device to interpret the first reason code.

19. The method of claim 15, wherein transmitting the first authorization request message comprises transmitting the first authorization request message further including the decision data element.

20. The transaction message processing server of claim 1, wherein said processor is further programmed to:

detect a second decision data element in a second authentication outcome data field of the authorization request message;

interpret the decision data element as an indicator that the transaction is not a highly authenticated transaction; and transmit a second enhanced authorization request message including a request that further authentication be performed.

* * * * *